Frank T. Barr
Karl Cohen   Inventors

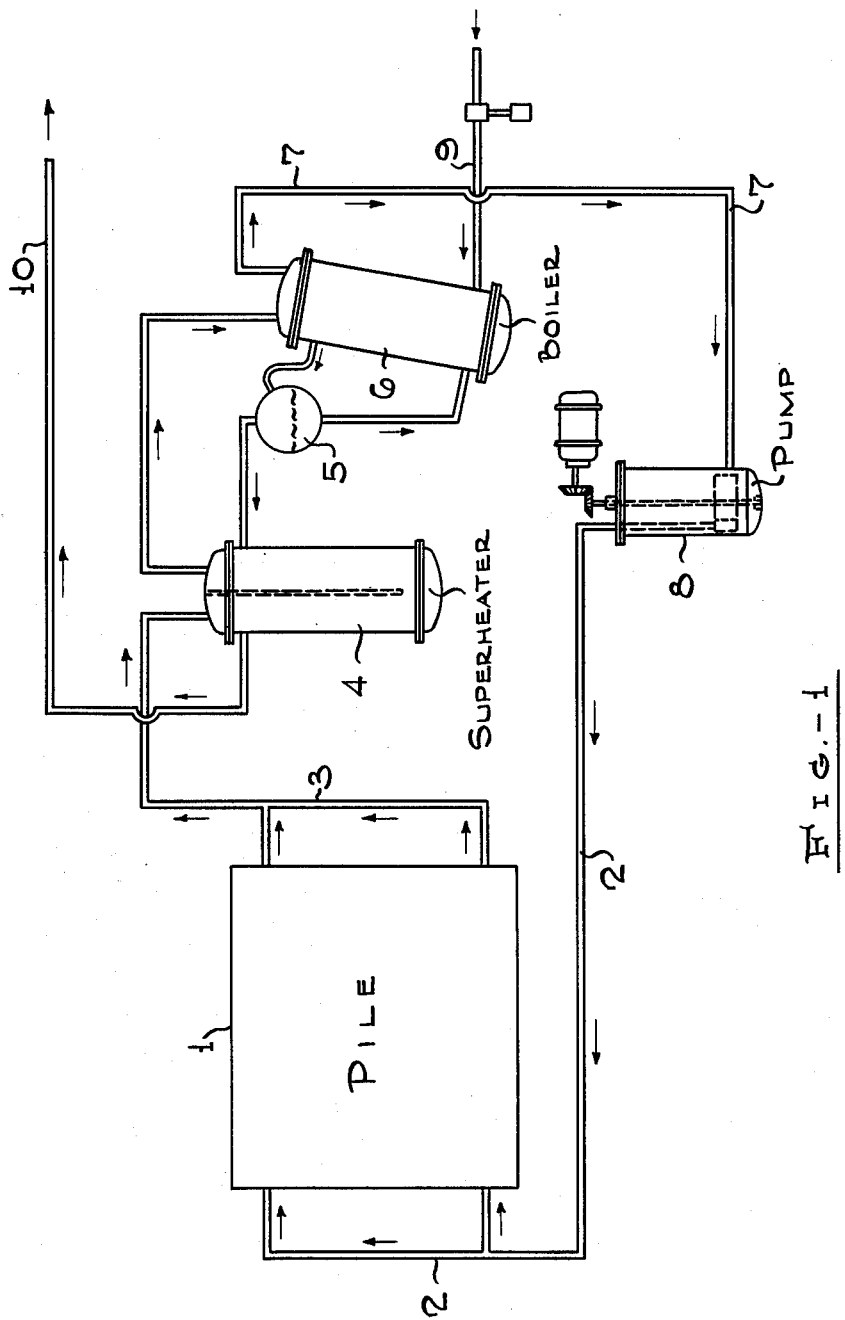

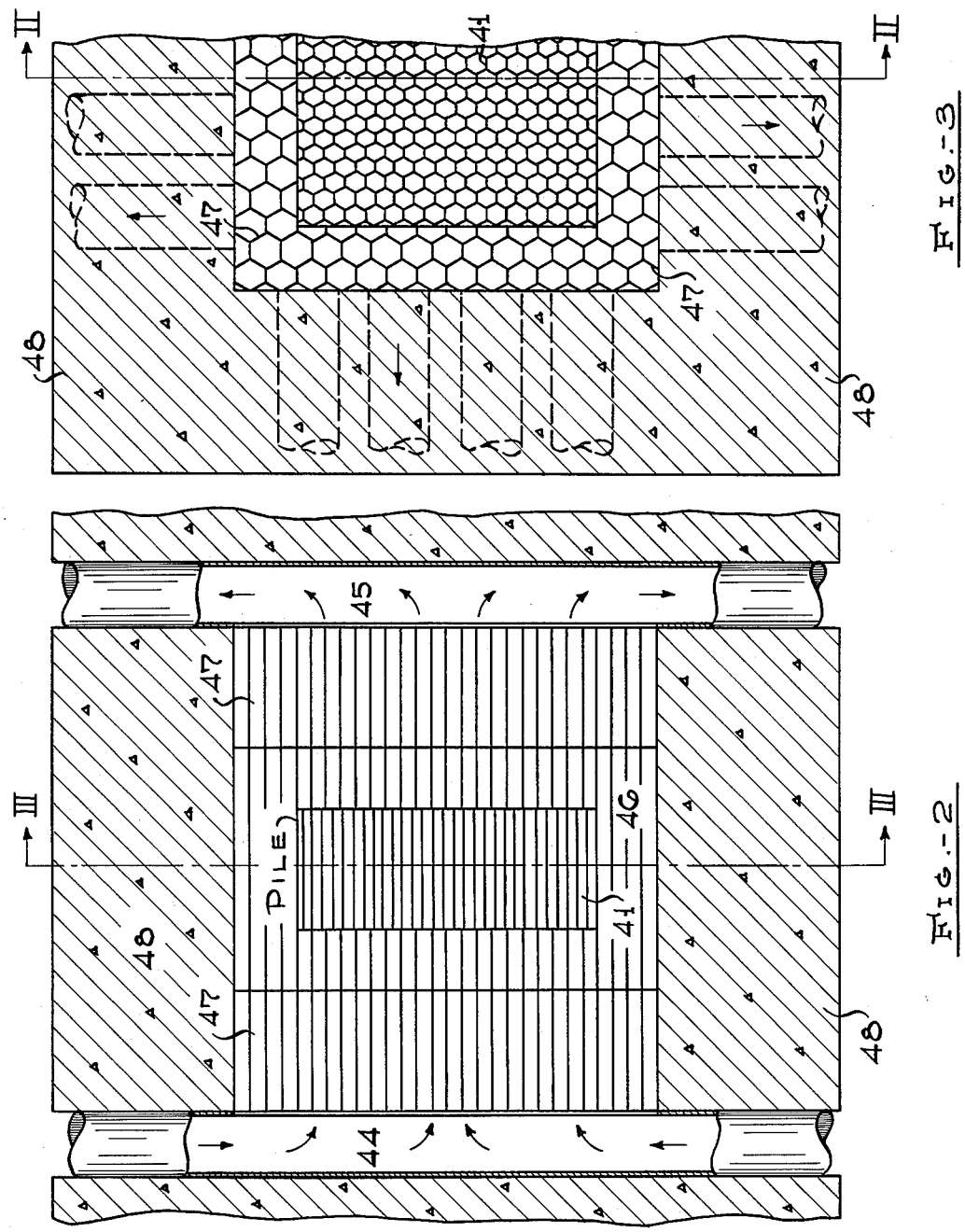

By _____ Attorney

United States Patent Office 3,205,138
Patented Sept. 7, 1965

3,205,138
APPARATUS FOR PRODUCING HEAT AND POWER BY THE APPLICATION OF NUCLEAR FISSION
Frank T. Barr, Summit, N.J., and Karl Cohen, Palo Alto, Calif., assignors to Esso Research and Engineering Company, a corporation of Delaware
Filed Feb. 28, 1961, Ser. No. 93,287
4 Claims. (Cl. 176—18)

The present invention relates to a process for producing heat and power for industrial purposes by application of nuclear fission and more especially to an apparatus including a pile and the ancillary equipment for carrying out the process.

More specifically, the instant invention describes an apparatus for producing power by nuclear fission which comprises an inner matrix of cellular cross section made up of sheets of beryllium. The sheets of beryllium are constructed so as to provide conduits therethrough. Such conduits may be defined, for example, by using a plurality of beryllium sheets with registering holes or, most preferably, by stacking together corrugated sheets.

The invention will be fully understood from the following description and the drawings. In the drawings, FIGURE 1 is a diagrammatic view of the pile and the ancillary equipment, that is to say, a steam boiler heated by a stream of a fluid heat transmission material employed to extract heat from the pile. The flow lines are indicated.

FIGURES 2 and 3 show sectional views at right angles to each other of a pile of somewhat different construction, in which corrugated plates are employed.

Figure 4:
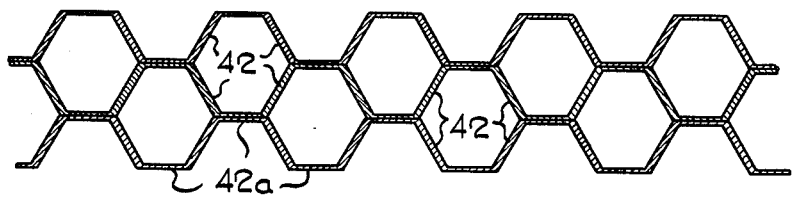
FIGURE 4 shows corrugated plates of the type employed in the construction of the pile shown in FIGURES 2 and 3.

An object of this invention is to produce a pile capable of operating at conditions suitable for generation of steam for industrial and power-generation uses, and of smaller size and reduced inventory of fissionable material per unit of power output, compared to that heretofore required. A further object of the invention is to devise methods for more efficient utilization of raw materials, and still other objects will be apparent to those skilled in the art.

Referring to FIGURE 1 of the drawings, numeral 1 indicates the nuclear reactor, or "pile" proper, which in this drawing is indicated merely as a square block. The cooling medium flows into the pile by a pipe 2 and after absorbing the heat of fission is withdrawn in a highly heated condition by pipe 3. It flows thence to a steam superheater 4 and then passes to the steam boiler which may be of any desired type but is shown with a steam separating drum 5 and a heat exchanger portion 6. After giving up its heat to the boiling water, the cooling medium passes through a pipe 7 and a pump 8 to the feed pipe 2 so that it will again flow through the pile, completing the closed circuit.

Returning to the boiler, it will be understood that the feed water enters by a pipe 9 and wet steam passes to the steam drum 5 where condensate is separated and returns to the boiler proper by an appropriate line. The separated steam passes from the steam drum to the superheater 4 and thence by pipe 10 to the point of utilization. It is an advantage of the instant invention that steam superheat is provided.

The above drawings show in general the overall arrangement that will be required, and it will be understood that nuclear reactors of any particular design may be employed in the above scheme so long as they are capable of operating at a high temperature level, say from 500 to 1200° F., and preferably from 750 to 1200° F., as required for steam generation, and are supplied with suitable cooling medium capable of withstanding this temperature and at the same time suitable for utilization within the pile without any undesirable effects. The invention is especially adapted to the use of coolants which may operate in the preferred range and even at 900° F. and higher.

A nuclear reactor design which is of particular advantage is described in FIGURES 2 and 3. The two sectional views, taken at right angles, are shown. In the design of this reactor, the fission zone or core of the pile proper is designated 41 and has a cellular cross section made up of corrugated sheets 42, three of which are illustrated in FIGURE 4. These corrugated sheets may be 0.05 to 1.0" thick, preferably 0.10 to 0.30". While normal corrugations, resembling alternating semicircles or a sine curve in cross section, may be used, the lines of contact formed using such design are such as to both reduce the rate of coolant flow nearby and to increase somewhat the average distance through which heat must travel in the neighborhood of the line of contact to reach coolant. This tends to produce hot spots in the sheet. By reducing the thickness of the sheet at these points, that is, by shaving off or flattening the top of the hump as at 42a, as shown in FIGURE 4, these disadvantages are avoided. Alternatively, or in addition, distribution of the fissionable material, described in more detail below, may be provided in a decreased concentration in the zones which are less vigorously cooled. These sheets 42 are piled together as shown diagrammatically in FIGURE 4, producing the cellular structure which can be readily seen in the cross section in FIGURES 3 and 6. In this case, the pile is preferably of a hexagonal, or possibly square, cross section instead of circular, and the corrugated sheets of beryllium or its oxide make up the matrix 41 with the cellular cross section with parallel longitudinal conduits. If desired, fuel rods containing fissionable material may be placed within these cells or conduits which run longitudinally from right to left in FIGURE 2, but in the particular design illustrated, the fissionable material is intended to be distributed throughout the moderating material, i.e., the corrugated beryllium sheets. The fissionable material may be spread over the inside surfaces of and between a pair of close-fitting, nested corrugated half-sheets, thereby affording protection from loss by erosion, corrosion, or solubility in the coolant, and so that it is distributed throughout the entire pile proper in a substantially uniform manner. Instead of spreading the fissionable material on sheet surfaces, it may be suspended or dissolved in the solid beryllium, and should in this case normally have particle size not greater than 100 microns, preferably not greater than 10 microns. In any case, it is distributed fairly uniformly; the greater care observed in this, the less likelihood there will be of hot spots. The cooling medium enters from header 44 and finally is drawn off by the header 45 after flowing through the cells or conduits in direct contact with the fissionable material or with the matrix material which is in turn in intimate contact with the fissionable material, depending on construction and the materials used.

Both reflectors and absorption zones are shown in the example of FIGURE 2, although it will be understood that nuclear reactors may be designed without either or both. The reflector zone comprises moderating material whose function it is to reflect back into the core of the reactor neutrons which would otherwise be lost to the system.

The absorption zone contains fertile material which, by absorption of neutrons which would otherwise be lost to the system, produces new fissionable material. This includes thorium and uranium–238, which produce fissionable uranium–233 and plutonium–239 in this way.

The reflector zone in this design is made up of the corrugated plates 46 which are of beryllium and the adsorption zone is of the same construction indicated at 47. Absorption material is distributed throughout plates 47 just as is fissionable materal over plates 41, and the absorption material may also be dissolved or dispersed through the plates 47, if desired. The radiation shield is shown at 48. In this design, the fissionable material is not removed and replaced during operation; but when this is required, part of the shield may be removed and the corrugated plates taken apart so that the pile may be completely disassembled. It then may be reconstructed with new or recovered plates as required. Provision for removing the corrugated plate assembly through an opening in the top of the shield is shown in FIGURE 5.

In the design of FIGURE 2, separate reflector and absorption zones are shown, and the absorption zone surrounds the core or pile proper only partially. Since the primary function of the absorption zone is the reproduction of fissionable material by utilization of the neutrons lost from the pile, production of fissionable material will normally be increased or decreased as the absorption zone surrounds more or less of the core. In addition, while it is sometimes desirable to increase neutron concentration in the core by means of a separate reflector, as, for instance, when design provides relatively large amounts of neutron absorbing material other than fissionable material in the core, the reflector and absorber zones can often be profitably combined, especially when it is desired to obtain maximum absorption in a zone surrounding the core, or fission zone.

It will be understood that various features of the prior designs shown hereinbefore may be selected and combined into piles of modified design.

Figure 6:
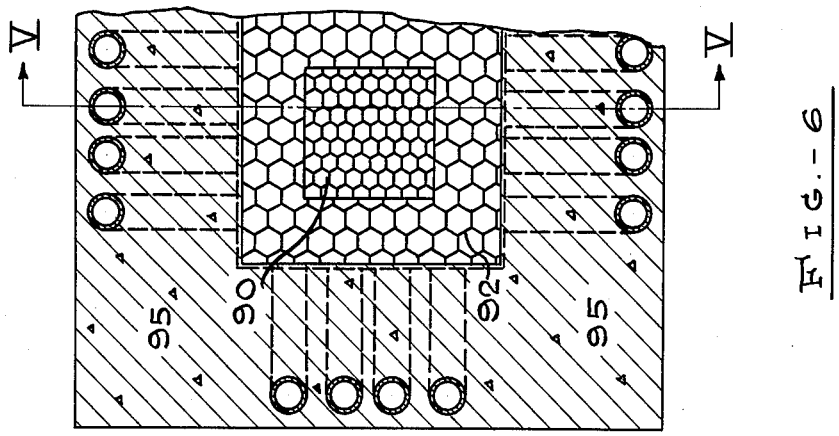
FIGURES 5 and 6 are sectional views again taken at right angles to each other of piles similar to those of FIGURES 2 and 3 respectively, but of somewhat varied construction.
Figure 5:
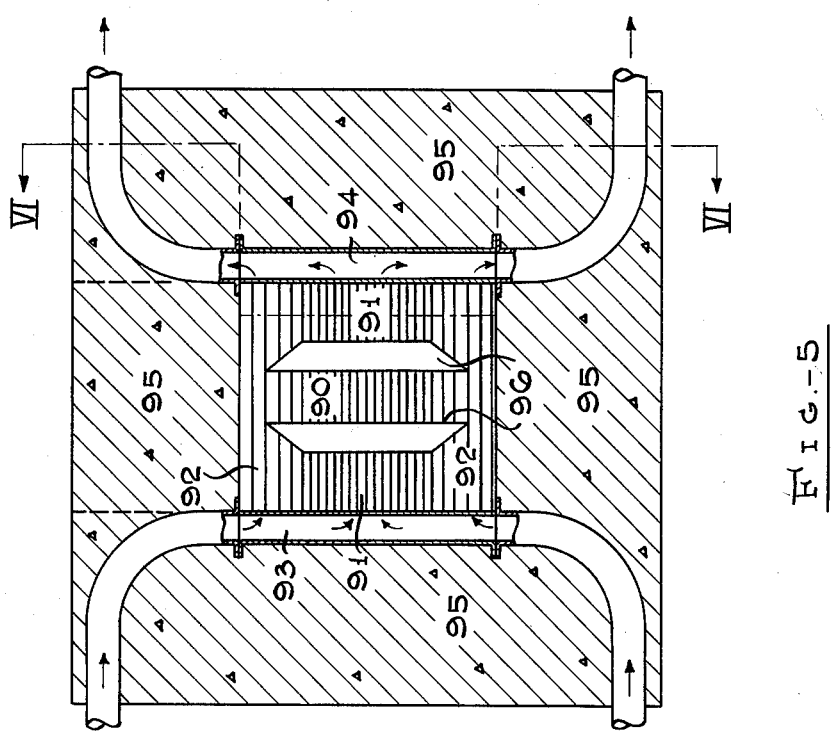

FIGURES 5 and 6 show another design, in which the fission and absorption zones 90, 91 and 92 are made of corrugated plates in which the fission or absorption material is spread as before. The cooling medium manifolds 93 and 94 are illustrated as well as the radiation shield 95.

The heat release within the core is much greater than in the other sections, and means should be provided to ensure a greater and more effective flow of coolant through that zone. Thus, the corrugations at 90 may be of smaller size than at 92, and the cross sectional areas for coolant flow may be greater in 90. This may be assisted, for example, by cutting away the plates as at 96 so that the greater part of the flow may be through the core, which, as provided above, is more open to coolant flow. Other means for accomplishing this purpose can be substituted.

The distinction between sizes of corrugations in zones 41 and zones 46 and 47 in FIGURES 2 and 3, and in zone 90 and zones 91 and 92 in FIGURES 5 and 6, are shown diagrammatically in the drawings as lines which may be interpreted as planar discontinuities, or as separators seen edge-on in FIGURES 3 and 6. While this type of construction may indeed be used, e.g., employing beryllium as the material of the separating plates, it is not necessary. The gradation in sizes may be accomplished by any suitable mechanical means, it being necessary only that the desired relative flow of coolant not be interfered with. It will also be understood that high coolant flow through relatively low heat producing zones is not in itself bad, but only unnecessary. Consequently, in FIGURES 2 and 3, for example, the corrugations in zones 46 and 47 in line with core 41 may, for convenience of construction, be of the same size and arrangement as those in core 41. Furthermore, these regions may be formed from continuous plates, the zones being differentiated by the position of the fissionable or fertile materials (or none) incorporated. Other means of mechanically obtaining the desired distribution of sheet thickness, corrugation sizes, etc., will be apparent, including the possibility of subdividing the inlet and/or outlet coolant manifolds 44 and 45 so as to obtain independent control of the coolant flowing through core 41 and that through zones 46 and 47 only, outside the core.

In order that the construction and operation of the present apparatus may be better understood, further details will now be given. The piles disclosed herein are designed and intended to operate on what may be termed a reproductive cycle. The pile consists of two principal portions, the fission zone or pile proper, also termed the core, wherein fission occurs, and the absorption zone, wherein excess neutrons are recovered by the absorptive material, which in turn is thereby converted to a fissionable material for subsequent use. There are several of these so-called reproductive cycles which might be used and, of these, two appear to be of the most interest at the present time. The first is the thorium-uranium cycle and the second, the uranium-plutonium cycle. Briefly, in the first of these cycles uranium–233 or an admixture of this with other fissionable material is employed in the fission zone and is distributed therethrough as a wire, rod, or in some other manner as disclosed above. With the assistance of a suitable moderator, the fissional material undergoes fission with the production of excess neutrons and energy in the form of heat. These neutrons are used in part to produce the further fission, being slowed down to a thermal or resonance level by the moderator, but some of the neutrons are lost from the core. The surrounding absorption zone which contains natural thorium absorbs a large share of these otherwise lost neutrons, and on absorption thorium is converted to U–233. Eventually, this material is recovered and may be employed in the fission zone.

The uranium-plutonium cycle is quite similar to the one given above except that plutonium–239 is employed as the fissionable material; and, in place of thorium, uranium–238 is used as the absorption material which is converted to plutonium–239. It will be understood that in these cycles it is not necessary that the fissionable material in the core be the same as that produced in the absorption zone. Within limits, fissionable materials are mutually replaceable, one by another. For example, since U–233 and Pu–239 are available only through use of the cycles described above, it is clear that the first reproductive cycle reactors must use the naturally occurring U–235 as fissionable material in the core.

In both of these cycles and in others that may be employed, it is very important to have a powerful moderator and to provide suitable cooling. It has been found that beryllium is an excellent material for pile construction because it possesses excellent moderating properties, low neutron absorption, high thermal conductivity, and structural properties such as strength, lightness, and high melting and softening points, required for the purpose. The high thermal conductivity of beryllium is important because capacity of the pile is almost directly proportional to this property in the solid containing the fissionable material. While other materials have been used, such as carbon, or carbon and low neutron absorbing structural material, such as iron, their characteristics are poor compared with beryllium for this particular purpose; and, by its use in the form of a matrix, the structural properties are obtained without the use of the usual materials of construction. In this way, materials of high neutron absorbing qualities may be entirely, or at least very largely, eliminated. The beryllium matrix acts both as a moderator and structural material. Piles so constructed are smaller and more efficient than any hitherto devised.

Most of the advantages of beryllium and certain other advantages, notably that of still higher allowable operating temperatures, may be obtained by using beryllium oxide as the moderating and structural material instead of beryllium metal. In this case, ceramic molding and shaping techniques must be used, rather than the metal-working and powder-metallurgy techniques which can be used with beryllium. In this sense, beryllium oxide may be understood as a possible substitute wherever the term "beryllium" is used in these specifications, with appropriate adjustments to care for the accompanying changes in density, coolant requirement, method of incorporation of the fissionable material, etc.

The form of the matrix employed in the present pile is made in several ways. For example, a large number of punched lamina are placed together so that the punched holes conform to produce a cellular structure with longitudinal channels through which the rods of fissionable material are placed and which serve for the passage of the cooling material. Most preferably, as shown in FIGURE 3, the matrix is made up of corrugated sheets so as to provide the cellular structure required when piled together as shown in FIGURE 4. Such construction is relatively cheap, easy to assemble, or to tear down, which is necessary in order to recover the fissionable material.

As indicated above, the reactors consist of a pile proper and an absorption zone. In some cases, the pile proper consists of a matrix of cellular structure and the absorption zone may take exactly the same form if desired.

Cooling, as indicated before, is a particularly important feature of the construction and operation of the present piles and it is effected in these cases by passing the cooling material through conduits within the matrix. For this purpose, materials of low neutron absorbing power are required and preferably molten sodium or sodium-potassium coolants should be employed. Other molten metals, such as lead, tin and their alloys, and aluminum, zinc, bismuth and magnesium, may also be used. Gas coolants such as hydrogen, deuterium or helium may also be employed. When gases are employed, it is necessary to design the matrix of the pile proper with conduits of greater total cross section than in the other portions of the pile, namely, the absorption zones, so that the greater portion of the gases flows through the pile proper. Conduits are enlarged, and redistribution of the gas is employed in the absorption zone, so as to reduce pressure drop. By proper design of the cross section ratios, it is possible to maintain a sufficiently low overall pressure drop to be practical. The cooling materials may be drawn from the pile at temperatures of 1,000 to 1,500° F. or higher, at which temperature they may be employed to produce high pressure superheated steam for industrial purposes or may be used directly in a closed cycle gas turbine system.

The function of the beryllium matrix in the above piles is to direct and distribute the cooling material and, at the same time, to act as a moderator in the fission reaction. A large amount of this material is always present in the pile, not only without ill effect, but it is required for its moderative properties. The amount may be, say, from 10 to 400 times the weight of the fissionable material present, depending on the particular fissionable material used, the size of the pile and other design factors. The cellular structure of the matrix is particularly important since its design controls capacity of the pile.

In the rod-type pile, conduits of roughly 0.4 to 2.0" in diameter, through which the fissionable material may be placed should be provided. These rods may be from 0.2" to 1" in diameter. Such piles may be operated continuously over a long period of time, the fissionable material being replaced from time to time when, say, 10 to 60% of the original material has been converted. In the absorption zone, rods may be larger, say ¾ to 4" in diameter, in holes ⅘" to 5" in diameter, although it will be understood that the absorption rods which are extensions of core rods must be of the same diameter as the core rods. In the case of piles made up of the corrugated plates, as in FIGURE 3, it will be understood that the plates, or half-plates referred to heretofore, may be coated with the fissionable material; or the latter may be admixed with, dissolved, or suspended in the beryllium making up the plate itself. In such manner, an excellent distribution of the fissionable material throughout the moderator is obtained. It will be understood that in the absorption zone the same general construction and features may be employed. The core section channels may be 0.05 to 2.00", preferably 0.10 to 0.30" across; and the thickness of the sheet from which the corrugated plate is formed 0.05 to 1.0", preferably 0.1 to 0.30". The absorption zone channels will be smaller, say 0.05 to 0.5" across for best results. This type of construction has many advantages, but these piles are not continuous in operation and must be taken down at intervals. This, however, is not difficult because of the particular construction.

The weight of fissionable material will run from 3½ to 10 kg. of U-235 in order to achieve criticality. However, additional fissionable material is necessary to overcome unavoidable neutron absorption effects and losses notably because of the coolant and to allow for burnup. Including these losses, about 15 to 50 kg. of enriched uranium should be provided, preferably about 30 kg. The weight ratio of moderator to fissionable material is in the range of 10 to 1 to 400 to 1, preferably 15 to 1. The minimum beryllium required, however, is about 500 kg. This minimum amount of beryllium requires at least 6 kg. of U-235 to give a critical core. However, as noted above, it is recommended that 30 kg. of fissionable material should be used. This gives a moderator to fissionable material weight ratio of about 17 to 1. Broadly speaking, however, the critical U-235 content can be reduced to ⅓ the maximum of the range specified above if the beryllium is increased threefold, so that a weight ratio of 400 is operable. Thus, if the amount of beryllium is limited by extraneous requirements to about 500 kg., 6 to 10 kg. of enriched U-235 is required; but, if 1000–1500 kg. of beryllium can be put into the core or its equivalent, the minimum amount of U-235 required is 3.5 kg. These amounts are given for U-235 as fissionable material. If other fissionable materials are used, the exact values will be changed somewhat, as is known in the art. As indicated above, additional fissionable material is required to overcome unavoidable neutron absorption effects and to allow for burnup.

Five hundred kg. of beryllium occupy about 7 to 8 cubic feet. If the allowance of space for coolant flow is, say, about 25% the total core volume, which should be arranged compactly in cylindrical or hexagonal prismatic spaces or the like, is about 10 cubic feet.

The blanket or absorber section which surrounds the core section is a zone about 2 feet thick. The total weight of thorium absorber material should be 50 to 500 times the weight of the fissionable material in the core, preferably about 100 times. The remainder of the 2 foot thickness is made up of beryllium and space for coolant flow to remove the relatively small amount of heat which will be generated in the blanket section. It should be noted that the U-235 produced by the thorium in the blanket can be used in new cores instead of U-235, which is normally available as fissile material.

Piles made according to the above description are relatively compact units, at least as compared with the large graphite-moderated, sodium-cooled piles of the present day construction and do not require the high pressure used in current water-moderated reactors to produce steam of sufficiently high temperature to be useful. For example, in a thorium cycle pile, the pile proper may consist of a cylinder 1⅔ to 5 feet in diameter and 5 to 1 feet in length.

When plates are removed from the piles, say when about 10 to 60% of the fissionable material is converted, they may be worked up and the nuclear reaction products may be recovered for other uses. The fissionable material can be recovered by known chemical and physical means and used in construction of other piles or may be replaced in the same pile as a portion of the core.

In order to control the operation of the present piles, the flow of cooling material must be carefully regulated throughout and instead of the single flow from right to left, as indicated above, return flows may be provided or, if desired, separate sections may be used with different cycles of cooling material. All of these are well within the capacity of the designer and need not be illustrated. Temperatures should be continually followed throughout the pile and the cooling medium should be adjusted in accordance with such temperatures. Control may also be gained by introduction of materials of high neutron absorbing quality such as boron or cadmium, just as in the case of the piles of present construction.

An example of the apparatus preferred in the instant invention may be described as follows:

The nuclear reactor may be made of the corrugated sheet construction illustrated in FIGURES 2 and 3. Beryllium is the structural material and suspended uranium–235 is the fissionable material. The weight ratio of beryllium moderator to fissionable material is about 17/1. A total of 30 kg. of fissionable material is used to maintain criticality. This amount is sufficient to overcome unavoidable neutron absorption effects and losses. In accordance with the above ratio, about 500 kg. of beryllium is required. The 500 kg. of beryllium occupies a volume of from 7 to 8 cubic feet. After allowance for space for coolant flow, the total volume of the core section is about 10 cubic feet, and this is disposed in hexagonal cross section 27" across and 30" in length. The sheet from which the corrugated plates are made is 0.15" thick, and the corrugations are so designed that channels for coolant flow 0.12" across are formed when the plates are stacked. This core can be operated at 50,000-100,000 kw. of heat without pushing it unduly.

The blanket or "absorber" section surrounding the core section is 2 feet thick, and the dimensions of the core plus the blanket are about 6 feet across by 6 feet in length, or 180 cubic feet in volume. Thorium absorber material is provided in the amount of 100 times the weight of the fissionable material, or 3000 kg. The rest of the 2 foot thickness is made up of beryllium and space for coolant flow to remove the relatively small amount of heat which is generated in the blanket section and will contain about 8000 kg. of beryllium. The U–233 produced by conversion of the thorium in the blanket section can be used in new cores instead of the U–235 normally used.

What is claimed is:

1. A pile for generating power by nuclear fission comprising an outer protective shield, an inner matrix comprising a series of stacked self-supporting sheets of one of beryllium and beryllium oxide, each sheet having regular flat-sided corrugations with adjacent sheets forming a laminate by surfaces of successive flat sides thereof contacting each other in a generally horizontal plane, fissionable material distributed throughout said matrix, a laminate of adjacent sheets thereby defining a plurality of horizontal passages for the circulation of a coolant therethrough, and header means at each end of said passages for containing and circulating said coolant.

2. The pile according to claim 1 in which said moderator sheets contain fissile material dispersed throughout the structure thereof, an outer matrix constructed of beryllium sheets in corrugated laminated form similar to said inner matrix surrounds at least a portion of said inner matrix, and a material distributed throughout said outer matrix capable of being converted to fissionable material on absorption of neutrons emitted by said fissionable material.

3. The pile according to claim 1 in which the thickness of each sheet of beryllium where said sheet contacts an adjacent sheet to form a laminate is reduced to approximately half thickness such that the combined thickness of adjacent sheets through contacting portions is substantially the normal thickness of a single sheet.

4. The pile according to claim 3 in which fissile material is located between said contacting portions to prevent contact of said material and said coolant.

References Cited by the Examiner
UNITED STATES PATENTS

| | | | |
|---|---|---|---|
| 2,056,563 | 10/36 | Budd. | |
| 2,609,068 | 9/52 | Pajak. | |
| 2,814,717 | 11/57 | Hardesty. | |
| 2,863,815 | 12/58 | Moore et al. | 176—29 |
| 2,920,025 | 1/60 | Anderson | 176—65 |
| 2,933,442 | 4/60 | Lawrence | 176—11 |
| 2,982,712 | 5/61 | Heckman | 176—20 |
| 2,988,495 | 6/61 | Battle | 176—73 |
| 2,990,351 | 6/61 | Sanz et al. | 176—71 |

FOREIGN PATENTS

| | | |
|---|---|---|
| 771,111 | 3/57 | Great Britain. |
| 135,148 | 4/52 | Sweden. |

OTHER REFERENCES

Harrer: Proceedings of the International Conference on the Peaceful Uses of Atomic Energy, vol. 3, page 250 (1955).

Glasstone: "Principles of Nuclear Reactor Engineering," Van Nostrand (1956), pp. 29, 42, 834.

Glasstone: "Principles of Nuclear Reactor Engineering," Van Nostrand (1956), pp. 495, 497, 498, 515 and 516.

CARL D. QUARFORTH, *Primary Examiner.*

LEON D. ROSDOL, *Examiner.*